Feb. 15, 1949.                M. R. LAING                    2,461,608
                         VALVE CONTROL APPARATUS
Filed Aug. 17, 1942                                      2 Sheets-Sheet 1
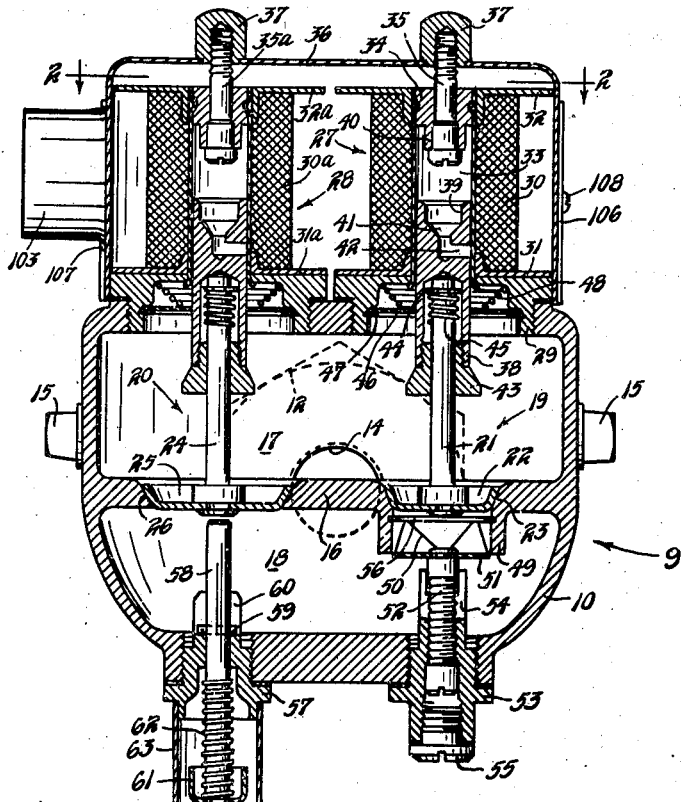
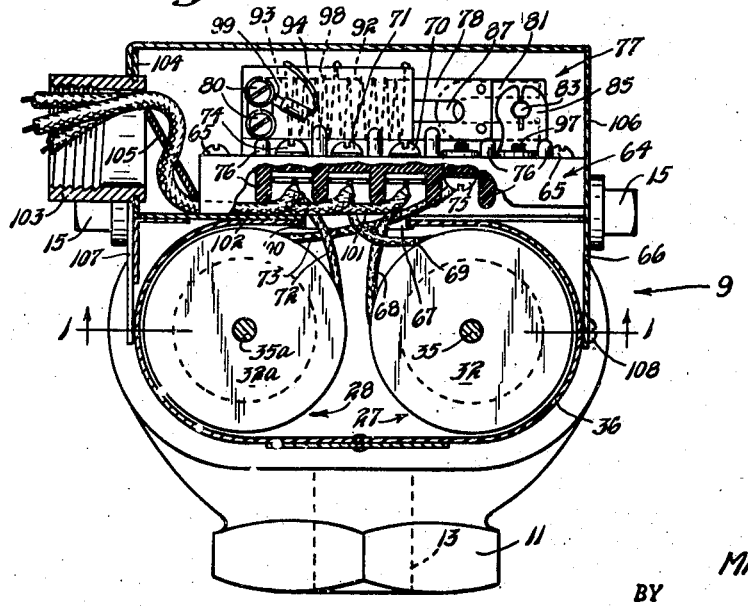
INVENTOR.
MARVIN R. LAING
BY
George H. Fisher
ATTORNEY

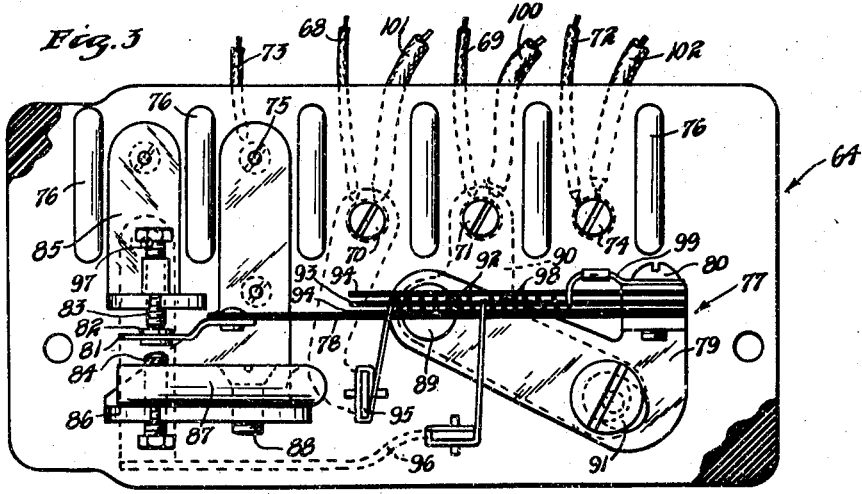
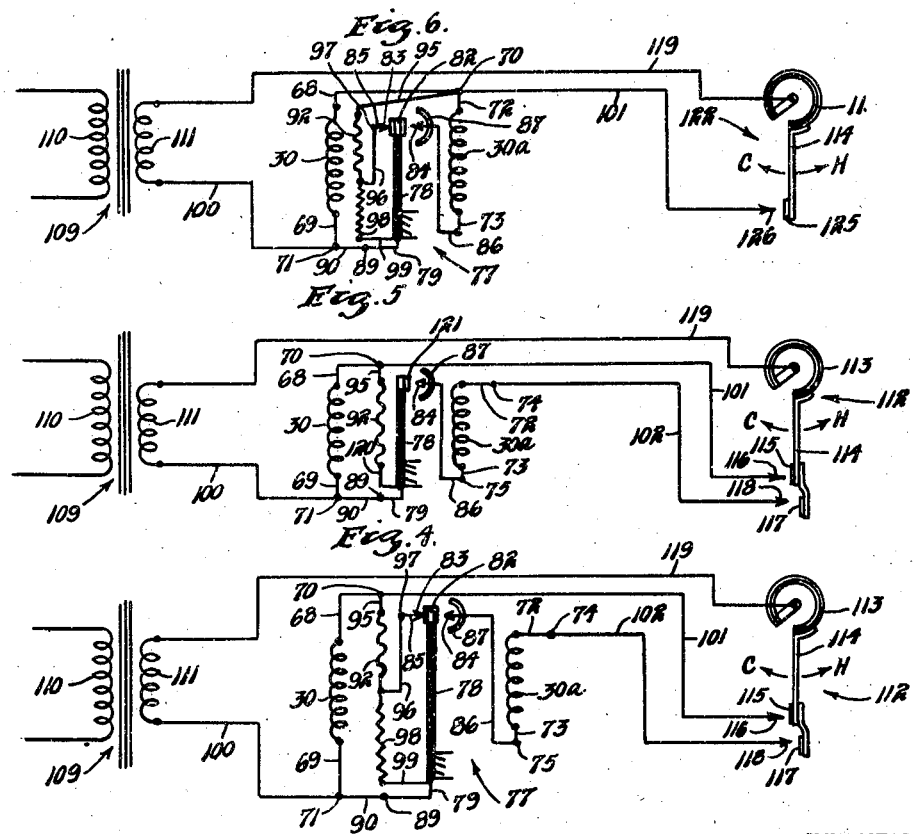

Patented Feb. 15, 1949

2,461,608

UNITED STATES PATENT OFFICE 2,461,608

VALVE CONTROL APPARATUS

Marvin R. Laing, Minneapolis, Minn., assignor to Minneapolis-Honeywell Regulator Company, Minneapolis, Minn., a corporation of Delaware Application August 17, 1942, Serial No. 455,099

8 Claims. (Cl. 236—68)

1

This invention relates to valves generally but more particularly to improvements in valve control apparatus in which electrically operable valves are utilized to special advantage in controlling the flow of a fluid fuel, such as a gas, for example, to a gas fired furnace.

In certain types of gas fired furnaces, if maximum gas flow is initially supplied to the burner, bad ignition characteristics of the furnaces develop, such as smothering of the pilot light, lifting of the flame off the burner, and puffing of flame out of the furnace doors resulting in scorched and burned paint and creating a fire hazard.

Various prior art devices have been devised for curing these troubles of which the "slow-opening" and "step-opening" valves are examples. In the case of the slow opening valves, means, such as an auxiliary motor, is employed and acts as a governor with respect to the main valve motive means to delay full opening of the valve. This arrangement is obviously an expensive, and therefore, unsatisfactory method of obtaining the results desired. In the case of the step-opening valves, means is provided for moving a single valve relatively rapidly to an intermediate position where it remains for a time period and after which it automatically moves relatively rapidly to the full open position.

The present invention contemplates a valve arrangement in which a pair of electrically operable valves are arranged in parallel. Upon an initial call for heat, one of the valves is opened to provide a minimum fluid flow. Concurrently with the opening of the first valve, a time period is initiated after which the second valve is opened providing maximum fluid flow. This arrangement, therefore, is well adaptable as a step-opening valve for overcoming the difficulties described above. The arrangement, moreover, may also be used for the same purpose in two-stage systems in which the first valve opens in response to a first predetermined temperature and the second valve opens in response to a second predetermined temperature substantially different than the first. Thus, in two-stage operation, if the thermostat setting is changed in a manner such that a call for second-stage operation occurs simultaneously with the initial call for heat or during the time period initiated upon the first call for heat, the opening of the second valve is nevertheless delayed until the end of the period.

Accordingly, an important object of this invention is the provision of a step-opening valve for use in a single stage system in which a first

2 of a plurality of valves and a timing means are energized upon an initial call for heat, thereby opening the first valve to provide a minimum fluid flow and initiating a time period after which a second valve is opened to provide increased fluid flow.

Another object of the invention is the provision, in a two-stage valve control system comprising electrically operable valves, of a timing means for delaying the opening of the second stage valve upon a call for operation thereof during the time period initiated by the timing means.

A further object of the present invention is to provide a pair of electrically operable valves arranged in a common valve body and an electric timing means for delaying the opening of one of the valves, the electric timing means being mounted on a panel which is secured to the valve body adjacent to the valve motive means, thereby providing a unitary structure in which the necessary electrical connections between the valves and the timing means conveniently may be carried by the panel.

Another object of the invention is the provision, in a unitary valve structure comprising electrically operable valves and an electric timing means for delaying the opening of one of the valves, of a means for reducing the energization of the timing means after the delayed valve has been opened, thereby preventing an excessive temperature rise of the structure.

Still other objects are those implied or inherent in the novel construction, combination, and arrangement of parts hereinafter described and claimed, reference being had to the accompanying drawings in which:

Figure 1 is a sectional elevational view of the valve structure as viewed along the lines 1—1 of Figure 2, Figure 2 is a plan view of the valve structure as viewed along the lines 2—2 of Figure 1, other parts being shown in section to disclose internal structures, Figure 3 is a face view of the terminal and timer panel.

Figure 4 is a diagrammatic view of a two-stage valve control system in which the valve structure of Figures 1 and 2 is employed, Figure 5 is a diagrammatic view of a two-stage valve control system in which a modification of the valve structure of Figures 1 and 2 is employed, and Figure 6 is a diagrammatic view of a single-stage valve control system in which the valve structure shown in Figures 1 and 2 is employed.

Referring to the drawings, numeral 9 generally designates a valve structure for controlling the flow of a fluid fuel such as a gas to a gas fired furnace. Although the valve is described in connection with a gas furnace, it will be understood that this reference is for purposes of disclosure only and not to be considered in a limiting sense since the valve is well adaptable for controlling other fluids as well.

The valve 9 comprises a valve body 10 having hexagonal projections 11 and 12 extending forwardly and rearwardly thereof, respectively. Extending through the projections 11 and 12 are outlet and inlet ports 13 and 14, respectively, which communicate with the valve chamber internally of the valve body 10 and by means of which the valve can be connected into the gas line communicating with the burner. The valve body 10 is also provided with plugs 15 which may be removed to provide openings for connecting the valve body into a gas line communicating with the pilot light. The valve chamber is provided with a partition 16 which divides the chamber into inlet and outlet chambers 17 and 18, respectively. The partition comprises a horizontal portion which extends the full width of the valve body to points forwardly and rearwardly of the inlet port 14 and outlet port 13. At the point forwardly of the inlet port 14, the partition extends diagonally downwardly and rearwardly to the corner of the valve body. From the point rearwardly of the outlet port 13 the partition extends diagonally upwardly and forwardly to the corner of the valve body. The partition is provided with a pair of openings which are controlled by a pair of valves generally designated by the numerals 19 and 20, respectively. The valve 19 comprises a stem 21 which carries a valve disk 22. The valve disk 22 cooperates with a seat 23 provided in the partition 16, the seat conforming to the shape of the disk to provide a fluidtight relation. Similarly, the valve 20 comprises a stem 24 which carries a valve disk 25. As in the case of the valve disk 23, the valve disk 25 cooperates with a seat 26 to provide a fluidtight engagement therewith.

The valves 19 and 20 are actuated by a pair of solenoid assemblies generally designated by the numerals 27 and 28, respectively. The assemblies 27 and 28 as shown are identical. Accordingly, the assembly 27 only will be described, and the same parts will be given the same reference characters. However, whenever it shall be necessary to distinguish the parts of one assembly from the other, the parts of assembly 28 will additionally carry the subscript $a$. Furthermore, the assemblies 27 and 28 comprise structures which are substantially the same as those described in the patents to Gille 2,114,961 and 2,269,016. Accordingly, these structures will be described but briefly herein, further reference being had to the foregoing patents for details of construction and operation.

The assembly 27 comprises a nut 29 which is secured and sealed to the valve body 10 as shown in Figure 1. The nut 29 supports an electromagnetic coil 30. Disposed above and below the coil 30 are flanged disks 31 and 32 formed of magnetic material. Extending through the nut 29, coil 30 and disks 31 and 32 is a sleeve 33 of non-magnetic material which is secured to the nut 29 in any suitable fluidtight manner. The top of the sleeve 33 is closed by a sleeve or shading coil 34 of non-magnetic material such as copper, the sleeve 34 being secured and sealed to the sleeve 33 to provide a fluidtight relation in the manner shown. Pressed into the sleeve is a magnetic pin 35. The pins 35 and 35a extend upwardly through holes provided in a casing 36 for housing the solenoid assemblies 27 and 28. The ends of the pins 35 and 35a are threaded to receive nuts 37 by means of which the casing 36 is secured to the valve body 10. The casing 36 is formed of magnetic material and extends closely adjacent to the disks 31 and 32 as clearly seen in Figures 1 and 2.

Loosely mounted in the sleeve 33 is a plunger 38. The upper end of the plunger is provided with a counterbore 39 which cooperates with a projection 40 on the sleeve 34 to guide the plunger in its upward movement. The plunger is further provided with a tapered counterbore 41 which is adapted to engage the tapered end of the magnetic pin 35. The plunger 38 is further counterbored to communicate with a transverse bore 42 for the purpose of preventing a dash-pot action as the stop pin engages the tapered bore.

When the coil 30 is energized a main magnetic flux is set up in the plunger 38, disk 32, casing 36, and the disk 31, by reason of which the plunger moves into engagement with the stop pin 35. In this position, a second flux path is provided through the plunger 38, stop pin 35, disk 32, casing 36, and the disk 31 back to the plunger. Since this flux path threads through the sleeve 34, the sleeve acts as a shading coil to shade the flux therethrough. Accordingly, this arrangement provides a shaded flux for holding the solenoid in positive engagement with the stop pin 35, thereby obviating the chattering which is otherwise present due to the cyclical nature of the alternating current.

It is desirable that the valve disks engage and disengage their respective seats with a hammer action. For this purpose, a lost motion connection is provided between each valve stem and its actuating plunger. To this end, the lower end of the plunger 38 is hollowed out to threadedly receive a nut 43 through which the stem 21 extends into the opening provided. The upper end of the stem 21 carries a snap ring 44 and a coil spring 45 is inserted between the snap ring and the nut 43. Thus, upon upward movement of the plunger, it first moves relatively to the stem 21 until it strikes spring 45 to raise the valve disk with a hammer action, the spring 45 serving to cushion the engagement between the plunger and the valve stem 21. A centering washer 46 is provided for centering the lower end of the plunger with respect to the sleeve 33 and also provides a spring tension on the plunger to break its engagement with the stop pin 35, the washer being retained in place on the nut 29 by a snap ring 47. To further prevent the plunger 38 from sticking to the pin 35 upon deenergization of the coil 30, a conical spring 48 is inserted between the nut 29 and the centering washer 46.

As previously pointed out, when the valve is used in connection with a gas fired furnace, it is desirable that only one of the valves open upon an initial call for heat. For this purpose, a timing means later to be described, is provided for delaying the opening of the valve 20 for a time period after the valve 19 has been energized.

It is also desirable that a means be provided for adjustably controlling the rate of flow through the first valve to open. For this purpose, a throttling adjustment is provided which may be manually adjusted to control the rate of flow through the port controlled by the valve 19. To this end, a flange 49 is provided integrally with the partition 16 below the seat 23. The flange 49 is notched to provide a plurality of V ports 50 and a throttling disk 51 is adapted to move axially of the flange to adjustably decrease the openings of the V ports. The disk 51 is carried by a screw 52 which in turn is adjustably carried by a packing nut 53 secured and sealed to the valve body 10 as shown in Figure 1. The top of the nut 53 is provided with a pair of transverse slots 54 disposed at 90 degrees to each other whereby the nut yieldably grips the screw 52 to hold it in an adjusted position. The upper end of the nut 53 is counterbored to freely receive the non-threaded end of the screw 52. The lower end of the nut 53 is further counterbored and threaded to receive a nut 55 in fluid-tight relation. The maximum adjustment of the throttling valve is determined by the engagement of the disk 51 with the packing nut 53. In this position, clearance is provided between the screw 52 and the nut 55 which assures that the nut 55 will be tightly engaged with the nut 53. The minimum adjustment of the throttling valve is determined by the engagement of the disk 51 with a snap ring 56 provided in the flange 49 as shown in Figure 1.

In case of power failure, it is desirable that one of the valves may be manually operable to provide fluid flow. For this purpose, a packing nut 57 is secured and sealed to the valve body 10 as shown in Figure 1. Extending through the nut 57 is an actuating pin 58 which carries a transverse pin 59 receivable in a transverse slot 60 provided in the upper end of the nut 57. The lower end of the pin 58 carries a button 61, and between the button and the nut 57 a spring 62 is inserted. A protective guard 63 is secured to the nut 57 and may be removed when it is desired to manually open the valve 20. In opening the valve, the pin 58 is moved upwardly into engagement with the valve by compressing the spring 62 until the pin 59 clears the top of the nut 57, after which a slight twist of the pin 58 moves the pin 59 out of the slot 60 to hold the pin 58 in an actuated position.

The valve 9 further comprises a panel generally indicated by the numeral 64. The panel 64 is carried by a plate 66, being secured thereto by suitable screws 65. The plate 66 in turn is secured to the casing 36 by any suitable means such as welding. An opening 67 is provided in the casing 36 and plate 66 through which the solenoid leads are brought out to terminals carried by the panel. The leads 68 and 69 of the solenoid 32 are connected to terminals 70 and 71, respectively, and the leads 72 and 73 of solenoid 32a are connected to terminals 74 and 75, respectively.

The timing means for delaying the opening of the valve 20 is mounted on the panel 64 and is generally designated by the numeral 77. The timing means 77 comprises a bimetallic element 78 which is carried on one end by a bracket 79 of electrically conductive material and is secured to the bracket by suitable screws 80. The other end of the element 78 carries a switch blade 81 which in turn carries a double faced contact 82. The contact 82 is engageable with spaced fixed contacts 83 and 84. The contact 83 is adjustably carried by a bracket 85 of electrically conductive material, and the contact 84 is similarly carried by a bracket 86 also formed of electrically conductive material. The terminal 75 is secured to the bracket 86. The bracket 86 also carries a permanent magnet 87 which is secured thereto by a suitable screw 88. The magnet 87 straddles contact screw 84 and is adapted to attract the switch blade 81, which for this purpose is formed of magnetic material and serves as an armature with respect to the magnet. Thus, the contact 82 moves into and out of engagement with the fixed contacts with a snap action, and is always in engagement with one or the other of the contacts. The bracket 79 is pivotally secured to a plate 90 of electrically conductive material which is secured to the underside of the panel 64 by a pivot 89. The terminal 71 is also carried by the plate 90. The opposite end of the bracket 79 is secured to the plate 90 by an eccentric screw 91 which may be adjusted to vary the position of the movable contact 82 with respect to the fixed contacts 83 and 84.

A heater 92 is mounted adjacent the element 78, being wound on a carrier 93 formed of any suitable material such as mica. Additional sheets 94, which also may be of mica, are disposed on each side of the carrier 93 and secured together with the carrier 93 to the bracket 79 by means of the screws 80. One end of the heater 92 is connected to an upwardly extending projection of an electrically conductive plate 95 which is secured to the underside of the panel 64 by the terminal screw 70. The other end of the heater is connected to the upwardly extending end of an electrically conductive plate 96 which is secured to the underside of the panel 64 by being connected to the bracket 85 by a screw 97.

Also mounted on the carrier 93 is a resistor 98 which may be wound thereon as shown in Figures 2 and 3. One end of the resistor is suitably connected to the adjacent end of the heater. The other end of the resistor is provided with a terminal 99 which is secured under one of the screws 80 to ground the heater to the bracket 79.

The terminals 70, 71 and 74 additionally serve as binding posts for external wiring 100, 101 and 102, respectively, by means of which the valve 9 may be connected into a valve control circuit. The wires 100, 101 and 102 are brought out through a nipple 103 which is carried by the right angle portion 104 of the plate 66. The wires are first threaded through a washer 105 which is disposed between the panel 64 and the nipple 103 in the manner shown. This arrangement relieves the connections between the wires and the terminals from stresses and strains applied to the wires externally of the valve 9. The panel 64 and timing means 77 are enclosed by a housing 106 which is bifurcated as shown at 107 to clear the nipple 103. The housing 106 is further held in place by a screw 108 which engages the solenoid housing 36.

In Figure 4, the electrical connections between the several parts of the valve 9 are shown schematically in connection with a transformer generally indicated by the numeral 109 and a two-stage thermostat generally indicated by the numeral 112.

The transformer 109 comprises a primary winding 110 which may be connected to a suitable source of A. C. power, and a secondary winding 111.

The thermostat 112 may be made responsive to a temperature indicative of a need for operation of the gas fired furnace. For example, the thermostat may be placed in a space which is heated by the furnace and may be made responsive to temperature variations in the space to initiate operation of the valve 9, which in turn controls the fluid flow to the furnace. The thermostat 112 may be any suitable three wire thermostat providing sequential actuation of a pair of switches, but is preferably of the two-stage type disclosed in Patent No. 2,285,446 to Carl G. Kronmiller, granted June 9, 1942. The thermostat 112 comprises a bimetallic element 113 which carries a switch blade 114. The blade 114 carries a first contact 115 which upon a first temperature drop engages a contact 116, the switch blade 114 moving in the direction of the legend C. Upon a further drop in temperature a second contact 117 carried by the blade 114 engages a fixed contact 118.

The terminal 70 is connected to the contact 116 by the external conductor 101, the terminal 71 is connected to the lower side of the secondary 111 of the transformer by the external conductor 100, the terminal 74 is connected to the fixed contact 118 by the external conductor 102, and a conductor 119 is connected between the top side of the secondary 111 and the bimetallic element 113.

In the operation of Figure 4, with the thermostat 112 in the position shown, the space is at the desired temperature. Upon a first drop in temperature the movable contact 115 engages the fixed contact 116 to establish a circuit for energizing the winding 30 and the heater 92. The circuit to the winding 30 may be traced as follows: from the top side of the secondary 111 through conductor 119, element 113, blade 114, contacts 115 and 116, conductor 101, lead wire 68, winding 30, lead wire 69 and conductor 100 back to secondary winding 111. Upon energization of the winding 30, the valve 19 is moved to an open position providing a minimum rate of flow to the furnace in accordance with the adjustment of the manual adjusting means. The circuit to the heater may be traced as follows: from the top side of the secondary 111 through the conductor 119, element 113, blade 114, contacts 115 and 116, conductor 101, conductor 95, heater 92, conductors 96, 85, contacts 83, 82, element 78, and the resistor 98 and conductor 99 in parallel to the conductor 79, thence through the pivot 89, conductor 90, and conductor 100 back to the secondary 111. It should be pointed out that because of the shunt circuit in parallel with the resistor 98 that practically no current flows through the resistor 98. Upon energization of the heater 92 a time period is initiated during which the element 78 is under the influence of the heat generated by the heater 92. Upon a continued drop in temperature causing further movement of the switch blade 114 in the direction of the legend C the contact 117 engages the contact 118. If this occurs before the end of the time period, a circuit is completed to the winding 30a upon movement of the element causing contact 82 to engage contact 84 with a snap action. This circuit may be traced as follows: from the top side of the secondary 111 through the conductor 119, element 113, blade 114, contacts 117, 118, conductor 102, lead wire 72, winding 30a, lead wire 73, conductor 86, contacts 84, 82, element 78, conductor 79, conductor 90, and conductor 100 back to secondary 111. Upon energization of winding 30a, the valve 20 is moved to its open position thus providing a maximum rate of flow to the furnace. Upon engagement of the contact 82 with the contact 84, the contact 82 disengages the contact 83, whereupon the circuit for shunting the resistor 98 is broken and the current through the heater is forced to flow through the resistor thereby substantially reducing the current flow. The current flow through the heater, however, is sufficient to maintain the contact 82 in engagement with the contact 84. This reduction in current flow makes it possible to supply a large amount of heat initially to obtain a short heating period, while thereafter maintaining the temperature low enough to give a short cooling period. A reduction in energization of the heater is further desirable inasmuch as it substantially reduces the temperature rise of the valve 9.

On the first rise in temperature, whereupon the blade 114 moves in the direction of the legend H, the contact 117 moves out of engagement with the contact 118 to immediately deenergize the winding 30a, the valve 20 then closing under the influence of gravity and the spring means heretofore described. A second rise in temperature, causing further movement of the blade 114 in the direction of legend H, causes the contact 115 to disengage the contact 116, whereupon the winding 30 and heater 92 are immediately deenergized. The valve 19 then moves to its closed position under the influence of gravity and its spring means.

In some instances where temperature rise of the valve and short timing periods are not a material operational consideration, the resistor 98 may be dispensed with. The connections for such an arrangement are shown in Figure 5. In the circuit of Figure 5, the heater 92 is provided with a terminal 120 similar to the terminal 89 secured to the resistor 98 and is similarly secured to the plate 79. Also, in Figure 5 the element 78 carries a single faced contact 121 rather than the double faced contact 82 of Figure 4.

In the operation of Figure 5, upon a first drop in temperature, the contact 115 engages the contact 116 to establish a circuit for energizing the winding 30 and the heater 92. The circuit to the winding 30 may be traced as follows: from the top side of the secondary 111 through the conductor 119, element 113, blade 114, contacts 115 and 116, conductor 101, lead wire 68, winding 30, lead wire 69, and conductor 100 back to secondary 111. Upon the energization of winding 30, the valve 19 is moved to its open position to provide a minimum rate of fluid flow. The circuit for energizing the heater 92 may be traced as follows: from the top side of secondary 111 through conductor 119, element 113, blade 114, contacts 115 and 116, conductor 101, conductor 95, heater 92, terminal 120, conductor 79, conductor 90, and conductor 100 back to the secondary winding 111. Upon the energization of the heater 92, a time period is initiated at the end of which the element 78 moves to cause contact 121 to engage the contact 84 with a snap action. If during the time period the temperature has continued to drop, the contact 117 will have moved into engagement with the contact 118 before the close of the period. In such case, upon engagement of the contact 121 with the contact 87, a circuit is established for energizing the winding 30a. This circuit may be traced as follows: from the top side of secondary 111 through the conductor 119, element 113, switch blade 114, contacts 117, 118, conductor 102, lead wire 72, winding 30a, lead wire 73, conductor 86, contacts 84, 121, element 78, conductor 79, conductor 90, and conductor 100 back to secondary 111. Upon energization of the winding 30a, the valve 20 is moved to its open position, thereby providing maximum fluid flow to the furnace.

As in the case of the circuit of Figure 4, upon a first rise in temperature the contacts 117 and 118 disengage to immediately deenergize the winding 30a and thereby cause the valve 20 to move to its closed position. Upon a second rise in temperature the contacts 115 and 116 are disengaged to immediately deenergize the winding 30 and the heater 92, thereby causing the valve 19 to close.

In Figure 6, a single stage circuit is shown in which the valve connections are substantially the same as those shown in Figure 4 with the exception that the lead wire 72 of winding 30a is connected to the terminal 70 rather than to the terminal 74 as in Figure 4. It should also be pointed out that if desired, the resistor 98 may be dispensed with as described in connection with Figure 5. In Figure 6, a single stage thermostat 122 is used which may be substantially the same as the thermostat 112 with the exception that but a single pair of contacts 125, 126 are employed.

In the operation of Figure 6, upon a first drop in temperature the blade 114 moves in the direction of the legend C causing engagement of the contact 125 with the contact 126 to establish a circuit for energizing the winding 30 and the heater 92. This circuit may be traced as follows: from the top side of the secondary 111 through the conductor 119, element 113, blade 114, contacts 125, 126, conductor 101, to the terminal 70, thence in parallel through the lead wire 68, winding 30, lead wire 69, to the terminal 71, and through the conductor 95, heater 92, conductor 96, conductor 85, contacts 83 and 82, element 78, conductor 79, and conductor 90 to the terminal 71, thence through conductor 100 back to secondary 111. Upon energization of the winding 30 the valve 19 is moved to its open position providing minimum fluid flow to the furnace. Upon energization of the heater 92 a time period is initiated after which the contact 82 disengages the contact 83 and engages the contact 84 with a snap action. As described in connection with Figure 4, upon disengagement of the contacts 82 and 83, the circuit shunting the resistor 98 is broken and the current to the heater is forced to flow through the resistor 98, thereby substantially reducing energization of the heater. Upon engagement of the contact 82 with the contact 84, a circuit is established for energizing the winding 30a. This circuit may be traced as follows: from the top side of secondary 111 through the conductor 119, element 113, blade 114, contacts 125, 126, conductor 101, lead wire 72, winding 30a, lead wire 73, conductor 86, contacts 84, 82, element 78, conductor 79, conductor 90, and conductor 100 back to secondary 111. Energization of the winding 30a causes the valve 20 to move to its open position thereby providing maximum fluid flow to the furnace.

Upon a first rise in temperature the switch blade 114 moves in the direction of legend H to disengage the contacts 125, 126 thereby simultaneously deenergizing the windings 30, 30a and the heater 92.

From the foregoing, it has been seen how in each of the circuits of Figures 4 through 6 the actuating windings 30 and 30a and the heater 92 are connected in parallel across a common source of power, and how the timing means 77 has been connected to delay the energization of the winding 30a in each case. It has also been seen that with a few simple changes these results may be obtained whether the valve be operated in a single or two-stage circuit.

From the foregoing it is now obvious that I have provided a valve structure which is well adaptable to fulfill the objects of the invention set forth hereinabove. While I have disclosed but a single structural embodiment of the valve, it is obvious that further embodiments and structural modifications thereof may be made. Accordingly, I contemplate all such changes as would naturally occur to those skilled in the art without departing from the spirit of the invention as defined by the appended claims.

I claim as my invention:

1. In a condition control system, in combination, a step-opening electric valve for supplying a fluid fuel to a burner at minimum and maximum rates of flow comprising a pair of valves, an actuating winding for each valve operable to move the same between closed and open positions when energized, and an electric time switch having an electric heater therein associated with the windings for providing a time delay between the energization of the windings, means responsive to a condition indicative of a need for operation of the burner for concurrently initiating the energization of one of the windings and said time switch to open one of said valves thereby providing a minimum rate of flow of the fuel, said time switch initiating a time period and being operable at the end of the period to concurrently reduce the flow of energizing current to said electric heater and energize the other of the windings to open the other of said valves to provide a maximum rate of flow.

2. In a condition control system, in combination, a pair of electrically operable valves for controlling the flow of a fluid fuel to a burner, said valves being operable to move from closed to open position when energized, an electric time switch concurrently energizable with a first of said valves and operable to delay the energization of the other valve for a time period, a means responsive to a condition indicative of a need for operation of the burner, a first switch means operable by said latter means in response thereof to a certain condition value for energizing said first valve and time switch, a second switch means operable by said latter means in response thereof to a different condition value and operable to energize said second valve after said time period, means controlled by said time switch for reducing the flow of energizing current to said electric time switch concurrently with the energization of said second valve, and means cooperating with said partly deenergized time switch for maintaining said second valve energized.

3. In a condition control system, in combination, a pair of electrically operable valves for controlling the flow of a fluid fuel to a burner, said valves being operable to move from closed to open position when energized, an electric time switch concurrently energizable with a first of said valves and operable to delay the energization of the other valve for a time period, a means responsive to a condition indicative of a need for operation of the burner, a pair of switch means operable in sequence by said latter means in response thereof to successive changes in the value of the condition, a first of said switch means completing a circuit for concurrently energizing said first valve and said time switch, and thereby initiating said time period, said second switch means being arranged in series in a circuit with said time switch and said second valve whereby the energization of the second valve is delayed when both said switch means are closed within said time period and said second valve opens immediately when said second switch means closes after said time period, and magnetic means operable to assist said electric time switch energize said second valve.

4. In a condition control system, in combination, electrical valve apparatus for supplying a fluid fuel to the burner of a condition changer at different rates of flow comprising a plurality of valves, an actuating winding for each valve operable to move the same between closed and open positions when energized, and a thermal time switch having a heater associated with the windings for providing a delayed opening of at least one of said valves, a source of power, means responsive to a condition indicative of a need for operation of said condition changer, and electrical connections between the source of power, condition responsive means, and apparatus, said connections providing a first circut for concurrently energizing said switch and at least one of said windings when said condition responsive means responds to a predetermined value of the condition thereby opening at least one valve to provide a first rate of fluid flow, said time switch concurrently initiating a time period, said switch being operable at the end of said time period to simultaneously cause a reduction in the supply of operating energy to said heater and the establishment of a second circuit for energizing the winding of said delayed valve to open the same thereby providing an increased fluid flow.

5. In an electric valve control apparatus, a valve housing having an inlet and an outlet, a pair of valves positioned in said housing intermediate said inlet and outlet and adapted to normally assume a closed position, electrical motive means for each valve, said motive means being operable when energized to move said valves to open position, electrical timing means so connected as to be energizable simultaneously with one of said motive means, means controlled by said timing means and operative to cause energization of the other of said motive means only after a time period during which said timing means is energized, and means for reducing the energization of said timing means to a fraction of its first energization concurrently with the energization of the electrical motive means of said other valve.

6. In an electrical valve control apparatus, a housing having an inlet and an outlet, a pair of normally closed valves positioned in parallel arrangement in said housing intermediate said inlet and said outlet, electrical motive means for each valve, said motive means being operable when energized for moving said valves to open position, electrical timing means having a heater energizable concurrently with one of said motive means, means operable concurrently with the energization of the other of said motive means for partially reducing the flow of energizing current to said heater, and means cooperating with said partly deenergized heater for maintaining said other motive means energized.

7. In an electrical control apparatus, a pair of normally closed valves, electrical motive means for each valve, said motive means being operable when energized to move and maintain said valves in open position, electrical timing means having an electric heater arranged in a parallel circuit and energizable concurrently with a first of said motive means to initiate a time delay between the energization of the first and second of said motive means, means for positioning a resistance in said parallel circuit to partially reduce the flow of energizing current to said heater concurrently with the energization of a second of said motive means, and means for removing the resistance from said parallel circuit upon deenergization of said second motive means.

8. In an electrical valve control apparatus, a pair of normally closed valves, a pair of electrically actuated means for causing said valves to move from closed to open position, and means for interposing a time delay between the opening movement of a first of said valves and a second of said valves, said last means comprising a thermoelectric device arranged in parallel with said electrically actuated means and operable to initiate a timing period upon energization of one of said electrically actuated means for operating a first of said pair of valves and to cause the energization of said electrically actuated means for operating the second of said pair of valves upon the termination of said time period, and means actuated by said thermoelectric device for partially reducing the flow of energizing current to said heater upon the energization of said electrically actuated means for operating said second valve.

MARVIN R. LAING.

REFERENCES CITED

The following references are of record in the file of this patent:

UNITED STATES PATENTS

| Number | Name | Date |
|---|---|---|
| 1,603,005 | Flam | Oct. 12, 1926 |
| 1,682,905 | Hill | Sept. 4, 1928 |
| 1,746,827 | Fry | Feb. 11, 1930 |
| 1,830,578 | Vaughan | Nov. 3, 1931 |
| 1,845,999 | Breese | Feb. 16, 1932 |
| 1,849,163 | Wilhjelm | Mar. 15, 1932 |
| 1,885,515 | Donohue | Nov. 1, 1932 |
| 1,952,299 | Van Valkenburg | Mar. 27, 1934 |
| 2,022,879 | Carlberg | Dec. 3, 1935 |
| 2,117,021 | Cotea | May 10, 1938 |
| 2,181,423 | Gille | Nov. 28, 1939 |
| 2,224,705 | Stringer | Dec. 10, 1940 |
| 2,226,856 | Gunter | Dec. 31, 1940 |
| 2,235,299 | Park | Mar. 18, 1941 |
| 2,241,324 | Selby | May 6, 1941 |
| 2,247,679 | Focke | July 1, 1941 |
| 2,250,507 | Thomas | July 29, 1941 |
| 2,276,607 | Bruno | Mar. 17, 1942 |
| 2,286,296 | McGrath | June 16, 1942 |
| 2,289,047 | Russel | July 7, 1942 |
| 2,289,310 | Steel | July 7, 1942 |
| 2,303,175 | Russell | Nov. 24, 1942 |
| 2,310,745 | Parks | Feb. 9, 1943 |
| 2,329,292 | Perry | Sept. 14, 1943 |
| 2,402,177 | Miller | June 18, 1946 |